(12) United States Patent
Yankovskiy et al.

(10) Patent No.: US 11,228,434 B2
(45) Date of Patent: Jan. 18, 2022

(54) DATA-AT-REST ENCRYPTION AND KEY MANAGEMENT IN UNRELIABLY CONNECTED ENVIRONMENTS

(71) Applicant: Zettaset, Inc., Mountain View, CA (US)

(72) Inventors: Maksim Yankovskiy, Mountain View, CA (US); Eric A. Murray, Los Gatos, CA (US)

(73) Assignee: ZETTASET, INC., Mountain View, CA (US)

( * ) Notice: Subject to any disclaimer, the term of this patent is extended or adjusted under 35 U.S.C. 154(b) by 384 days.

(21) Appl. No.: 16/359,964

(22) Filed: Mar. 20, 2019

(65) Prior Publication Data

US 2020/0304304 A1    Sep. 24, 2020

(51) Int. Cl.
*H04L 9/08* (2006.01)
*H04L 29/08* (2006.01)
(Continued)

(52) U.S. Cl.
CPC .......... *H04L 9/0897* (2013.01); *H04L 9/3263* (2013.01); *H04L 41/28* (2013.01); *H04L 63/0471* (2013.01); *H04L 67/12* (2013.01)

(58) Field of Classification Search
USPC ....................................................... 713/153
See application file for complete search history.

(56) References Cited

U.S. PATENT DOCUMENTS 10,664,574 B1 * 5/2020 Powers ............... G06F 21/6218
2007/0226777 A1 * 9/2007 Burton .................... H04L 63/08
726/2
(Continued)

FOREIGN PATENT DOCUMENTS

WO   WO-2016115633 A1 *  7/2016  ............. H04L 9/085

OTHER PUBLICATIONS

Abdmeziem et al, "A Decentralized Batch-based Group Key Management Protocol for Mobile Internet of Things (DBGK)", 2015 IEEE International Conference on Computer and Information Technology, Oct. 26-28, 2015, pp. 1109-1117, IEEE, Liverpool, UK.
(Continued)

*Primary Examiner* — Sakinah White Taylor
(74) *Attorney, Agent, or Firm* — Asif Ghias (57) ABSTRACT

Techniques are disclosed for securing data-at-rest at an internet-of-things (IoT) site with an unreliable or intermittent connectivity to the key manager operating at a corporate data center. The IoT site deploys one or more IoT devices/endpoints that generate IoT data according to the requirements of the site. The IoT data generated by these devices is collected/aggregated by one or more gateway devices. The gateways encrypt their data-at-rest gathered from the IoT devices using cryptographic keys. In the absence of a reliable connection to a backend corporate key manager, the design employs LAN key managers deployed locally at the IoT site. The gateways obtain keys from the LAN key managers to encrypt the IoT data before storing it in their local storage. The LAN key managers may periodically download keys from the corporate key manager or generate their own keys and then later synchronize with the corporate key manager.

18 Claims, 7 Drawing Sheets

(51) Int. Cl.
*H04L 29/06* (2006.01)
*H04L 12/24* (2006.01)
*H04L 9/32* (2006.01)

(56) References Cited

U.S. PATENT DOCUMENTS

| | | | |
|---|---|---|---|
| 2010/0306533 A1* | 12/2010 | Phatak | G06F 21/40 |
| | | | 713/156 |
| 2012/0011360 A1 | 1/2012 | Engels et al. | |
| 2013/0159728 A1* | 6/2013 | Beckwith | H04L 9/3255 |
| | | | 713/189 |
| 2015/0121063 A1* | 4/2015 | Maller | H04L 63/045 |
| | | | 713/153 |
| 2016/0205106 A1 | 7/2016 | Yacoub et al. | |
| 2016/0226732 A1 | 7/2016 | Kim et al. | |
| 2016/0269179 A1* | 9/2016 | White | H04L 9/0897 |
| 2017/0041316 A1 | 2/2017 | Setchell et al. | |
| 2017/0192414 A1* | 7/2017 | Mukkamala | H04L 63/0823 |
| 2017/0250799 A1* | 8/2017 | Stueve | H04L 9/0861 |
| 2017/0302669 A1 | 10/2017 | Chen et al. | |
| 2018/0041490 A1 | 2/2018 | Hampel et al. | |
| 2018/0075262 A1 | 3/2018 | Auh | |
| 2018/0131765 A1* | 5/2018 | Puleston | G06F 16/907 |
| 2018/0160358 A1 | 6/2018 | Nenner et al. | |
| 2018/0205711 A1* | 7/2018 | Kumar | G06F 21/602 |
| 2019/0238331 A1* | 8/2019 | Chandra | H04L 9/0894 |
| 2019/0268906 A1* | 8/2019 | Perdomo | H04W 72/0453 |
| 2019/0288840 A1* | 9/2019 | Gallancy | H04L 9/085 |
| 2019/0349426 A1* | 11/2019 | Smith | H04L 41/12 |

OTHER PUBLICATIONS

Ralambotiana, "Key management with a trusted third party using LoRaWAN protocol", Thesis, KTH Royal Institute of Technology, Jan. 1, 2017, KTH Royal Institute of Technology, Stockhom, Sweden.

Pandya et al, "Enhancement of Security in IoTSys Framework", Proceedings Of International Conference on Communication and Networks, Apr. 8, 2017, pp. 31-43, Springer Link, Singapore.

Perez, "Efficient Key Generation and Distribution on Wireless Sensor Networks", Master's thesis, KTH Royal Institute of Technology, Feb. 1, 2013, KTH Royal Institute of Technology, Stockhom, Sweden.

Raza, "Lightweight Security Solutions for the Internet of Things", Doctoral Thesis, Dept of Computer Science and Engineering, Malardalen University, Jun. 1, 2013, Sweden.

Stenquist_Et_Al, "Device Security for the IIOT", White paper, Renesas (https://www.avnet.com/wps/wcm/myconnect/onesite/5c44f792-fb07-4b85-adf8-8f6a1a0e1632/White+paper_Device+Security+for+the+IIoT.PDF?MOD=AJPERES&id=1489609404879), Jul. 1, 2016, CA, USA.

* cited by examiner

DATA-AT-REST ENCRYPTION AND KEY MANAGEMENT IN UNRELIABLY CONNECTED ENVIRONMENTS

FIELD OF THE INVENTION

This invention relates generally to the field of cyber-security and specifically to securing data-at-rest in gateway devices of an unreliably connected Internet-of-Things (IoT) environments.

BACKGROUND ART

The evolution of internet-of-things (IoT) in substantially the last decade has brought together devices and technologies that promise to connect virtually all aspects of life. More specifically, the IoT is a network of devices, sensors, controls, appliances, vehicles, objects or literally any "things" allowing such things to connect, interact and exchange data. These things or devices have either already or now fast proliferating all industries and aspects of human society. They are installed at homes as well as industrial sites of all kinds (terrestrial or extra-terrestrial), transportation routes, moving vehicles, etc. either standalone or integrated with other domestic or industrial assets. One estimate forecasts the number of such devices in the world to be over 200 billion by the year 2020.

These IoT devices are meant to be pervasive, usually manifesting in physically small form-factors and oftentimes with inexpensive price tags. As such, the realistic expectation of additional computing resources and capabilities available on these endpoint devices, other than those required to do their primary functions, is marginal. Thus, it is impractical to physically guard or protect all of such endpoint devices in a given environment or to "harden" them at the hardware or software level. This often leaves them insecure and vulnerable to data theft, infiltration, exfiltration or other types of security attacks.

The above problem is most pronounced at a gateway device in a given IoT environment that aggregates data from a large number of endpoint devices or simply endpoints or IoT devices or edge devices. The IoT gateway, or gateway device, or simply a gateway, is also typically another IoT device that aggregates the IoT data from other IoT devices or endpoints. The IoT data thus collected and stored as "data-at-rest" at the gateways is in plaintext or unsecured and thus vulnerable to attacks. The problem is further exacerbated because the IoT environment has oftentimes unreliable or intermittent connectivity to the internet cloud and consequently to a backend corporate data center. Further, corporations usually follow a best practice of locating their encryption key managers in the corporate data centers.

Since data-at-rest encryption requires continuous or at least periodic access to the corporate key manager, the lack of reliable connectivity means that the gateways cannot reliably obtain encryption keys to encrypt all incoming IoT data. Therefore, many current IoT environments or sites suffer exposure to data exploitation attempts on their gateway devices that store the IoT data in the clear. Most often, once the above-mentioned connectivity is restored, the communication between the gateway and the corporate key manager is via secure socket layer (SSL) and hence encrypted. However, while the data sits in the local storage of the gateway in the IoT environment, it is in the clear and vulnerable to security attacks. A key innovation of the present design is thus to secure and encrypt the data-at-rest on the gateway devices of the IoT environments or sites.

At a general level, there are plenty of prior art teachings providing security solutions for the IoT. U.S. Patent Publication No. 2017/0192414 A1 to Mukkamala et al. describes systems and methods that are configured for managing industrial assets. In one example, information about industrial assets or their use conditions, such as gathered from sensors embedded at or near industrial machines or assets themselves can be aggregated, analyzed, and processed in software residing locally or remotely from the assets. In another example, applications can be provided to optimize an industrial asset for operation in a business context. In another example, a cloud-based asset management platform can include development tools to facilitate development by end-users of applications for interfacing with and optimizing industrial assets, and for managing relationships between various industrial assets.

U.S. Patent Publication No. 2017/0302669 A1 to Chen et al. teaches a mobile device having first and second communication interfaces. The device may receive from another device a dispatch message to receive data from an IoT device. Based on the dispatch message, the mobile device may send to the other device a device key. The mobile device may receive from the other device a session ticket generated by the other device. The IoT device may have previously received a copy of the session ticket. The mobile device may send the session ticket to the IoT device and receive data from the IoT device via the first communication interface based on matching the copy of the session ticket. The mobile device may format the data for transmission via the second communication interface. The mobile device may also send via the second communication interface the data to a network device.

U.S. Patent Publication No. 2016/0205106 A1 to Yacoub et al. discloses a method for subscribing to a data feed from an IoT device. The method comprises obtaining using a subscribe application program interface (API) of a container, a subscription request to subscribe to the data feed from a requestor. The container is operable to provide one or more services to the IoT device through one or more APIs. The subscription request is associated with data stored in one or more domain name system records determining that the subscription request is permissible based on a list of approved requestors. The container then provides the data feed to the requestor, such that the requestor may be another container or another IoT device.

Non-patent literature (NPL) doctoral thesis entitled "Lightweight Security Solutions for the Internet of Things" by Shahid Raza of Malardalen University, Vasteras, Sweden dated June, 2013 argues that the future internet will be an IPv6 network interconnecting traditional computers and a large number of smart objects or networks such as Wireless Sensor Networks (WSNs). According to the thesis, the IoT requires multi-faceted security solutions where the communication is secured with confidentiality, integrity, and authentication services. Using standardized mechanisms, communication in the IoT can be secured at different layers: at the link layer with IEEE 802.15.4 security, at the network layer with IP security (IPsec), and at the transport layer with Datagram Transport Layer Security (DTLS).

According to the thesis, even when the IoT is secured with encryption and authentication, sensor nodes are exposed to wireless attacks both from inside the WSN and from the internet. Hence an Intrusion Detection System (IDS) and firewalls are needed. Since the nodes inside WSNs can be captured and cloned, protection of stored data is also important. The thesis purportedly has three main contributions. First, it discusses the pros and cons of secure communication strategies in the IoT using lightweight compressed yet standard compliant IPsec, DTLS, and IEEE 802.15.4 link layer security. Second, it presents the design, implementation, and evaluation of a novel IDS for the IoT. Third, the thesis provides experimental evaluation of the different solutions for securing resource-constrained devices in the IoT using IPsec, DTLS, and 802.15.4 security.

NPL reference "A Decentralized Batch-based Group Key Management Protocol for Mobile Internet of Things (DBGK)" by Abdmeziem et. al of University of Sciences and Technology, Houari Boumedienne, Algiers, Algeria dated October 2015, argues that constrained devices in the IoT will often operate in groups to achieve collective monitoring or management tasks. For sensitive and mission-critical sensing tasks, securing multicast applications is therefore highly desirable. According to the reference, for secure group communications, several group key management protocols have been introduced. However, the majority of the proposed solutions are not adapted to the IoT and its strong processing, storage, and energy constraints. In this context, the reference introduces a novel decentralized and batch-based group key management protocol to secure multicast communications. Their protocol reduces the rekeying overhead triggered by membership changes in dynamic and mobile groups and guarantees both backward and forward secrecy.

NPL master's project thesis "Efficient Key Generation and Distribution on Wireless Sensor Networks" by Victor Perez of KTH Electrical Engineering, Stockholm, Sweden dated February 2013 teaches that the introduction of IPv6 has broadened the address space available and IEEE802.15.4 and adaption layers such as 6loWPAN allow the intercommunication of small devices. These networks are useful in many scenarios such as civil monitoring, mining, battlefield operations, as well as consumer products. Hence, practical security solutions for the intercommunication must be provided, ensuring privacy, authenticity, integrity and data freshness. In most cases, WSN nodes are not tamper-proof and have very limited available resources and capabilities, which makes public key infrastructure (PKI) unattractive for this environment. At the same time, key pre-distribution provides too low security for most applications. Therefore, the communication bootstrapping or the key generation and distribution problem is an important concern to be addressed with the additional difficulty of the constrained capabilities of WSN nodes.

In the thesis, a solution to this problem is described. It makes use of Elliptic-curve Diffie-Hellman (ECDH) protocol with curve K-163 for key exchange, AES-CCM-128 for symmetric encryption for lowering the processing overhead and a partial challenge solving chain. Several hash functions were purportedly analyzed as well as several random number generating approaches reviewed. At the same time, in order to fit the key generation and distribution algorithms together with the regular sensor operation, code optimizations were purportedly carried out on the cryptographic library Relic-Toolkit. This resulted in reducing the memory footprint to 4 KB. Code reductions on Contiki OS allowed it to run using only 18 KB of flash and the peripheral drivers developed for the CC430 reduced the computation time as well. The solution allowed generating and distributing keys in-situ. The solution has purportedly proved to be resilient to most adversaries while taking into account scalability, portability, energy consumption, thus making it suitable for consumer applications.

However, in view of both patent and non-patent literature teachings, a key short-coming observed in the prior art is that it does not describe techniques for securing data-at-rest on IoT devices or endpoints while taking into account the intermittency or unreliability of the network. The network, such as the internet or cloud provides connectivity between an IoT site and the corporate data centers. Most corporations are mandated to host their corporate key managers within their secure data centers and not on locally on an IoT site. Because of the intermittent connectivity between an IoT site and its devices and the corporate key manager, as IoT data becomes available and gets aggregated at a gateway, it cannot be instantly and reliability encrypted at-rest. As a result, one cannot be certain that the aggregated data in an IoT gateway device will always be encrypted and secured from attacks.

The prior art is also silent about providing a LAN key manager that is a local to the IoT site. Such a LAN key manager, absent in prevailing techniques, would download a batch of keys from the corporate key manager and make them available to the gateway for data encryption. The prior art is further silent about providing a local key manager discovery protocol that will allow new endpoints and gateways to discover and auto-enroll the LAN key manager upon booting.

OBJECTS OF THE INVENTION

In view of the shortcomings of the prior art, it is an object of the invention to provide systems and methods for securing data-at-rest on IoT gateways in an IoT environment or site.

It is also an object of the invention to provide techniques for encrypting data-at-rest in an IoT environment when its connectivity to the corporate key manager operating in a remote data center is intermittent.

It is further an object of the invention to provide one or more LAN key managers in an IoT environment that periodically download cryptographic keys from the corporate data center, and make them available to the IoT gateways for encryption.

It is also an object of the invention to provide a local key manager discovery protocol that allows new gateway devices that come online in the IoT environment to discover the LAN key manager(s) and connect with it/them.

Still other objects and advantages of the invention will become apparent upon reading the summary and the detailed description in conjunction with the drawing figures.

SUMMARY OF THE INVENTION

A number of objects and advantages of the invention are achieved by apparatus and methods designed for securing data-at-rest in an internet-of-things (IoT) environment or site. The secure IoT environment/site has intermittent or unreliable connectivity to the corporate data center where one or more corporate key managers is/are operating/running. A corporate key manager is in charge of ensuring that cryptographic keys are available to other devices that need to secure the corporate data by encryption.

According to the chief aspects, the secure IoT site contains one or more IoT devices that are typically sensors or measuring devices, but can be any type of devices that generate data during their functioning. This data is referred to herein as IoT data. These devices are deployed on a local area network (LAN) operating at the IoT site. The IoT data is collected and aggregated by one or more IoT gateway devices or simply gateway devices or even more simply just gateways operating at the IoT site and deployed on the same LAN. The gateways are responsible for storing this data and transmitting/communicating it to the corporate data center when the intermittent connection/connectivity between the IoT site and the corporate data center is working/established.

However, during the time period that the data is stored or is "at rest" on the gateways, it needs to be protected/secured/encrypted. Because the connectivity of the IoT site to the corporate key manager is unreliable, the gateway devices cannot always count on having a ready access to cryptographic keys to encrypt their data-at-rest. In the techniques of the prior art, the data-at-rest during this time period is unsecured or exposed or vulnerable.

The present design solves this problem by ensuring that the gateway devices always have a ready supply of cryptographic keys so that they can always encrypt the IoT data aggregated from IoT devices/sensors and before storing it on their storage media. This is accomplished by having one or more LAN key managers that operate locally at the IoT site and are deployed as members of the same LAN of which the IoT devices and the gateway are members.

The one or more LAN key managers contain a ready supply of keys for the gateways whenever they need the keys for encryption.

The LAN key managers have this ready supply of cryptographic keys by periodically interfacing with the corporate key manager when the connectivity of the IoT site to the corporate data center is restored or established. In one embodiment, they download the keys in batches from the corporate key manager during the above interfacing. In alternative embodiments, they generate their own keys and later synchronize with the corporate key manager during the interfacing. In a variation, they may use the key management interoperability protocol (KMIP) known in the art for the above synchronization/synchronizing.

As new gateway devices are added to the LAN at the IoT site/environment, they use a local key manager discovery protocol to identify the existing LAN key managers at the site. They can then connect to the LAN key managers for obtaining keys as needed for encrypting the IoT data aggregated/collected by them from the various IoT devices or endpoints. In the preferred embodiments, the present design uses symmetric key encryption to encrypt the IoT data on the gateway devices.

Once the data-at-rest on the gateway devices is secured per above, they can then transmit this data to an appropriate target server in the corporate data center during a time period when the connection between the site and the data center is working. The data transmission may utilize any uploading scheme/model as desired, such as batch/periodic upload, push or pull based upload, etc. The IoT site may preferably be operating at an oilrig, a moving vehicle, a foreign embassy, an industrial site, a medical facility, a scientific exploration site, etc. In practice, the instant IoT site may be virtually any conceivable environment where devices are deployed that generate data based on their functions and which needs to be collected and secured by gateways, despite unreliable connectivity to a key manager. Such devices are conveniently referred to herein as IoT devices.

In the preferred embodiment, the local key manager discovery protocol utilizes a broadcast scheme such as a domain name system (DNS) to allow the gateways to determine the IP addresses of the LAN key managers based on human readable names. In such an embodiment, the DNS names and IP addresses of the LAN key managers are stored in a pre-known DNS name server as DNS records. The devices look up the names of existing LAN key managers at the site from the DNS name server, connect to them using their IP addresses and authenticate themselves.

For the purpose of authentication, the local key manager discovery protocol utilizes digital certificates. In such an embodiment, each gateway device is provisioned with a digital certificate that contains identifying information such as names and/or IP addresses of the LAN key managers. Using this information, the gateways thus connect and authenticate with the LAN key managers. In either case, replacement and/or new gateway devices are able to discover and "auto-enroll" with the LAN key managers without human intervention.

Clearly, the system and methods of the invention find many advantageous embodiments. The details of the invention, including its preferred embodiments, are presented in the below detailed description with reference to the appended drawing figures.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
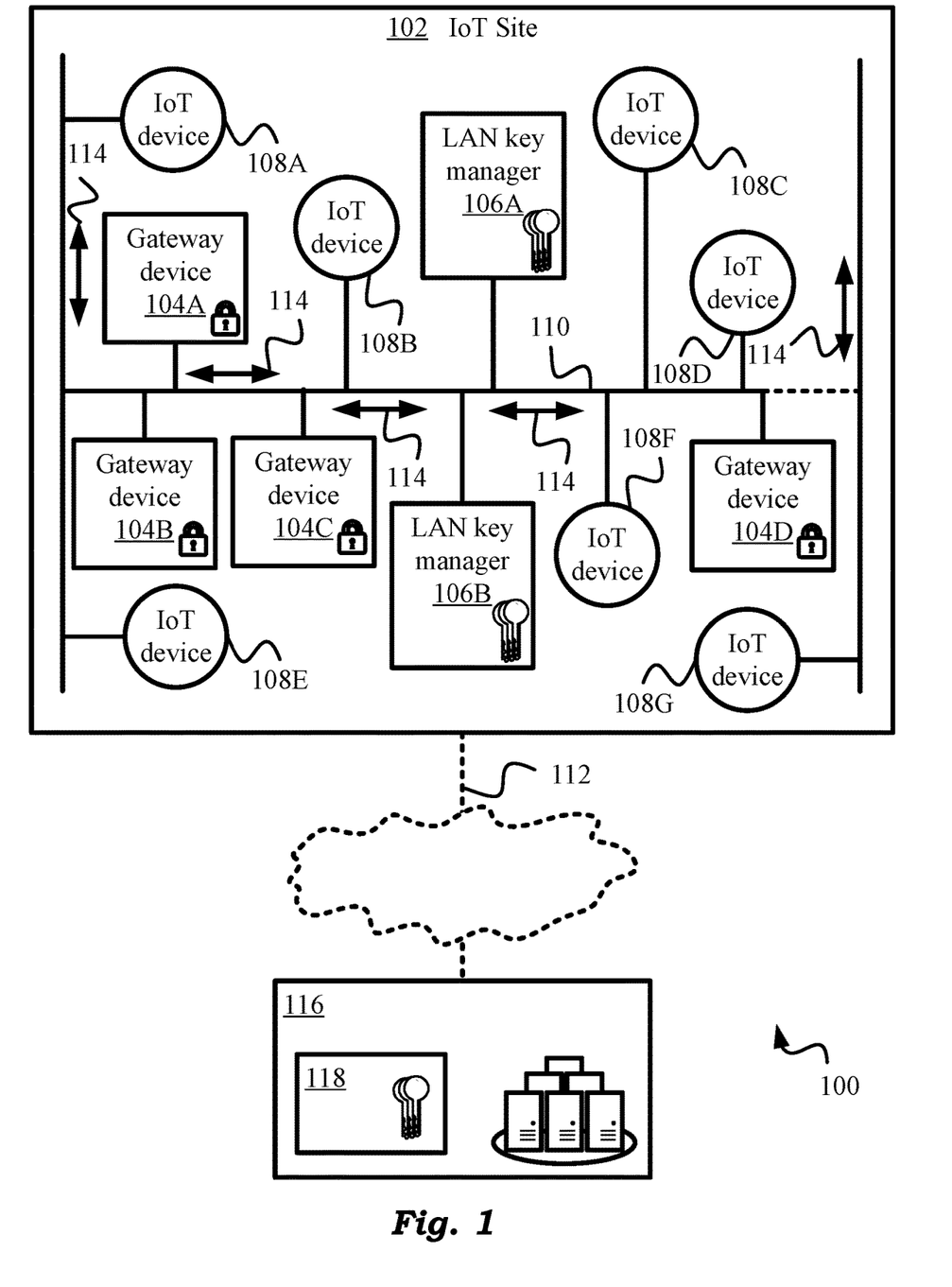
FIG. 1 is a block diagram of the various components of a secure IoT site according to the invention.

The present invention will be best understood by first reviewing systems and methods for securing data-at-rest in a secure IoT environment as illustrated in FIG. 1. Embodiment 100 of FIG. 1 shows an internet of things or internet-of-things (IoT) environment 102 that contains a variety of IoT devices or endpoints 108. Any number of IoT devices 108A, 108B, . . . are permitted at site 102. Their number may be in the dozens, hundreds or thousands or even more depending on the implementation. There are also a number of IoT gateway devices 104. Any number of such IoT gateway devices, or simply gateway devices, or even more simply gateways are possible. Four such gateways 104A, 104B, 104C and 104D are explicitly shown in FIG. 1. IoT environment/site 102 of FIG. 1 also shows a number of LAN key managers 106 of the present design. Again, any number of such LAN key managers are permitted, however two LAN key managers 106A and 106B are explicitly shown in FIG. 1.

IoT environment or site 102 can be practically any environment or location or site, stationary or moving, terrestrial or extra-terrestrial, where IoT 108 devices are deployed. Exemplarily, site 102 can be an oilrig where IoT devices/sensors 108 are used to monitor the various operational parameters of the rig. For example, devices/sensors 108 may be measuring tank liquid levels, loads on winches, pressures on the drill-bit, torque on the top drive, etc. IoT site/environment may alternatively be an embassy and devices/sensors 108 may be various security devices, such as surveillance cameras, fence monitors, intrusion detectors, etc. Site 102 may alternatively be virtually any other site and sensors 108 may be deployed to monitor various aspects of the systems deployed there.

Environment 102 may also be a medical facility, such as a hospital, and devices/sensors 108 may be various types of medical and infrastructure sensors, such as pressure, temperature and flow sensors installed on anesthesia delivery machines, respiratory monitoring and blood pressure monitoring equipment, ventilators oxygen concentrators, sleep apnea machines, blood analyzers ventilators, kidney dialysis machines, infusion and insulin pumps, organ transplant system temperature monitoring and control, neonatal intensive care units, blood analyzers, hospital beds, surgical fluid management systems, and pressure-operated dental instruments, gas mixing, and electro-surgery. Devices/endpoints/sensors 108 may also be image sensors deployed equipment related to radiography, minimally invasive surgery, fluoroscopy, cardiology, mammography, dental imaging, endoscopy, external observation, laboratory equipment, ocular surgery and observation, and artificial retinas, etc. Sensors 108 may also be accelerometers and biosensors deployed according to their medical applications.

IoT site 102 may also be any other site of scientific exploration such as polar and ocean exploration expeditions and space missions. Site 102 may also be a moving vehicle, such as a truck driving to a site to drop off or pick up goods, or a train, a car, a bus, a plane, a rocket, etc. Above is only a handful of examples of IoT site/environment 102 of the embodiment shown in FIG. 1, and the present technology admits to almost endless possibilities for site 102 and sensors 108 for its various implementations. As noted, the IoT sites, such as site/environment 102 may contain hundreds, or thousands or more IoT sensors devices 108.

FIG. 1 also shows a communication network 112 connecting site 102 to a backend corporate data center 116. Communication network 112 is a Wide Area Network (WAN) like the internet or the "cloud" or a Metropolitan Area Network (MAN) with physical connections supported by any combinations and variety of communications infrastructure including wired, optical and wireless. Corporate data center 116 contains various kinds of computing resources required by the corporation, including a corporate key manager 118. Corporate key manager 118 is responsible for managing the lifecycle of cryptographic keys required to keep IoT data secure and encrypted.

Gateways 104 are responsible for collecting and aggregating data generated by IoT devices 108 at site 102 and uploading it to corporate data center 116, and more specifically to an appropriate or target backend server (not shown in FIG. 1) at data center 116. The IoT data is collected via a local area network 110 of which all IoT devices 108 at site 102 are members.

The IoT data is then usually transmitted/communicated in a secure manner taking advantage of one of a number of available technologies of the art for securing data in-transit such as secure socket layer (SSL)/transport layer security (TLS), IPSec, etc. However, data-at-rest residing in the storage space/media of gateway devices 104A, 104B also needs to be secured. In order to secure the IoT data, the gateways require cryptographic keys from corporate key manager 118 via communication network 112.

However, many practical installations of IoT sites suffer from poor reliability and hence intermittency of network 112. As a result, there are period of times when none of gateways 104 can access corporate key manager 118 to obtain keys for encrypting IoT data as it arrives from sensors 108. Thus, in the techniques of the prior art, the IoT data-at-rest remains exposed or vulnerable to attacks on gateway devices 104 before connection/connectivity 112 can be re-established/restored for obtaining keys for encrypting the IoT data. The present design solves this problem as disclosed herein. While the below teachings extensively refer to an IoT site/environment such as site 102 of FIG. 1, the instant principles apply equally to securing data on any LAN, such as LAN 110, that has intermittent or unreliable connectivity to a key manager.

The intermittency or unreliability of connection 112 may be due to an intentional and malicious act/hack by an adversary/hacker or simply due to a human error. It may also be merely an artifact of the practical reality and placement of the site due its very nature and/or harsh or remote location or its mobility. In any event, the present technology factors in the unreliability/intermittency of connection 112 or more specifically by dramatically reducing the reliance on a continuous and an always-available connectivity to corporate key manager 118.

The above objective is achieved by having one or more LAN key managers 106A, 106B, . . . as members of or connected to local area network 110 introduced above. Each of LAN key managers 106 acts as the local key manager for devices 108 connected to LAN 110. More specifically, each of LAN key managers 106 act as a local key manager to the gateway devices 104 that are in charge of aggregating and encrypting IoT data from IoT devices 108. This innovation relieves IoT environment 102 from its continuous dependency on corporate key manager 118 operating in remote data center 116.

According to the main aspects, a LAN key manager, such as LAN key manager 106A, keeps a batch of cryptographic keys that it periodically downloads from corporate key manager 118 during a time period when connection 112 is established or connected or working. It then provides these keys to a local gateway 104, such as gateway 104C as needed. As IoT devices 108 connected to LAN 110 operate at IoT site, they generate data, referred to herein as IoT data, based on their respective functionalities. This IoT data is marked by reference numeral 114 in FIG. 1. Exemplary IoT devices and the respective functions were provided above, but as noted, these can be virtually any type of devices generating data based on the functions they are performing.

In routine cases, IoT data 114 thus generated may be sensor measurements, or it may include results of further processing or analytics performed on raw sensor data by respective devices 108. It could also be purely computational data produced by one or more IoT devices based on their algorithmic computations with or without sensor measurements. Devices 108 then transmit their respective IoT data 114 on LAN 110, which may be wired, optical or wireless, to one of gateways 104.

Gateways 104 are responsible for aggregating IoT data 114, and securely storing it and periodically communicating it to an appropriate backend target server in remote corporate data center 116. During the time that this data is being stored, or is "data-at-rest" in the storage media of gateways 104, it must be secured or protected or encrypted.

In the preferred embodiment, LAN key managers 106A, 106B, . . . have access to a shared set of keys on LAN 110 at IoT environment/site 102. Explained further, one or more or all of LAN key managers 106A, 106B, . . . may be in charge of downloading cryptographic keys from corporate key manager 118 when connection 112 is working. This downloading may be triggered based on a time interval or when the number of available keys at site 102 dips below a predetermined threshold. In exemplary implementations, each batch of downloaded keys may comprise of 500 to 1000 keys, although the batch could be of any size. In an extreme case, the exemplary batch size for the keys is 1, which means that each key is requested from the corporate on an on-demand/as-needed basis.

Once these keys have been downloaded to site 102, they are then stored on one or more shared physical nodes connected to LAN 110. In one embodiment, it is a device/node running one or more of logical LAN key managers 106 that stores the keys. The storage media on the device may be a hard disk drive, a solid-state drive, including a flash drive, a universal service bus (USB) drive, a storage area network (SAN) drive, or any other type of data storage medium. The stored keys are then shared amongst the various operating logical LAN key managers 106 from this physical node/device.

In another embodiment, the keys are stored in a distributed storage/space on LAN 110 that is shared amongst LAN key managers 106. Exemplary distributed shared storage models suitable for the present design include storage area networks (SAN) and the like. It is important to have the shared storage/space for the keys also encrypted and secured in IoT environment 102. This is easily accomplished by LAN key managers 106 by utilizing additional wrapping keys to encrypt the shared storage space on LAN 110 that holds the cryptographic keys for IoT data 114.

Thus, one or more LAN key managers 106 at IoT site accesses these shared keys and provides them to gateway devices 104. The provision of keys from LAN key managers 106 is typically on a "pull" basis/model, or in other words, upon a request from a gateway device for a key when it needs to encrypt IoT data. Alternatively, the provision may be on a "push" basis/model, or in other words, where a LAN key manager 106 provides keys to a gateway device based on a predetermined key distribution scheme. Still alternatively, a combination of push and pull models may be used to provide keys to gateways devices 104.

Once a key from the batch of keys has been used to encrypt data on gateways 104, the key can be securely destroyed at LAN key managers 106 and gateways 104. This ensures that existing data that is already encrypted can only be decrypted in corporate datacenter 116 and not on the gateway, provided no additional analytics have to be run on the encrypted data at site 102.

Innovating over the prior art, the present design guarantees that the IoT data-at-rest will always or nearly always be protected. This is achievable because gateway devices 104 always have a ready supply of cryptographic keys as needed from LAN key managers 106 that are local to IoT environment 102. In practical implementations of site 102, each of gateway devices 104 is responsible for gathering, aggregating and securing data from a given subset of IoT devices 108. This assignment of IoT devices 108 to gateways 104 may be based on one or more of number of schemes, including the proximity of the gateway to the IoT devices/sensors, matching of computing and storage capabilities requirements between the gateways and the IoT devices, matching of respective scheduling of the gateway and the IoT devices, among others. Furthermore, data may be gathered by gateways 104 from IoT devices 108, either using a push or a pull model or a combination.

Depending on the configuration of a given implementation, any number of keys may be needed by gateways 104, such as gateway 104D, to secure IoT data 114 received and aggregated by it. In an exemplary case, only one key is needed by gateway 104D to encrypt data from all of IoT devices 108 that it is responsible for aggregating data from. In a converse exemplary case, gateway 104D uses a unique key D, F, G, . . . per IoT device 108D, 108F, 108G, . . . to encrypt their respective data. Any other type of encryption regime for encrypting the IoT data by gateways 104 is conceivable within the present scope.

Cryptographic keys used by gateways 104 are expired according to key management techniques known in the art. When a key is expired and a new key needs to be obtained, the gateway 104 will request a LAN key manager 106 for a new key. Thus, LAN key manager 106 acts as a local key manager that is a "proxy" of corporate key manager 118 running in remote data center 116. It preferably provides all key management functions as corporate key manager 118 would but locally at IoT site 102. However, in alternate embodiments, it may just be responsible for providing keys to the gateways and not necessarily managing their entire lifecycle, which would be the responsibility of corporate key manager 118.

As noted, when connection 112 between IoT environment 102 and corporate data center 116 is working, one or more LAN key managers 106 connect or interface with corporate key manager 116. In one exemplary implementation, LAN key managers 106 do not generate cryptographic keys but only download them from corporate key manger 118 during this interfacing. Preferably, the download of keys is done in batches, such as 500 to 1000, or any other suitable number of keys. After the download of a batch of keys, LAN key managers 106 provide these cryptographic keys to gateway devices 104 per above explanation.

Depending on the implementation, one or more or all of LAN key managers 106 may be responsible for this interfacing, downloading the keys and storing them in a secured shared storage on LAN 110 per above explanation. Once the downloaded batch of keys is exhausted or running low, LAN key manager(s) 106 interface with corporate key manager 118 at the next opportunity when connection 112 is established. Another batch of keys is downloaded from corporate key manager 118 and so on. LAN key managers 106 thus periodically interface with corporate key manager 118 when more keys are needed and when connection 112 is working. This way, IoT environment 102 and specifically gateway devices 104 always have a ready supply of cryptographic keys to encrypt incoming IoT data 114 from IoT devices 108 for encryption before storage, and for subsequent transmission to backend data center 116.

In an alternative implementation, one or more or all of LAN key managers 106 generate their own cryptographic keys using techniques known in the art and independently of corporate key manager 118. Then during their periodic interfacing with corporate key manager 118 when connection 112 is working, they synchronize with the corporate key manager. During synchronizing the key-IDs of the locally generated keys is communicated to corporate key manager 118, so that it is aware of those keys being used in IoT environment 102. Corporate key manager 118 can thus ensure not to regenerate those same keys and to expire them and manage their overall lifecycle per the corporate security policy/policies. In one embodiment, the present design uses key manager interoperability protocol (KMIP) known in the art for this synchronizing.

In the preferred embodiment, the above-mentioned keys downloaded by LAN key managers 106 or generated by them are symmetric keys. Symmetric encryption has the advantage that it is more efficient at processing large amounts of encryptions and is computationally less intensive than encryption with asymmetric keys. However, in alternate embodiments, asymmetric keys for asymmetric encryption, also referred to as public key cryptography, may be used. A related variation may use digital certificates issued by a suitable certificate authority (CA).

In the variations using asymmetric encryption, corporate key manager 118 is responsible for generating a public/private key-pair. When connection 112 is working or in other words established, one or more LAN key managers download the key-pairs. In order to ensure the security of this communication, a key exchange protocol known in the art may be used. Also, key wrapping of the key-pairs may be performed. Once a LAN key manager 106 has obtained a key-pair, it communicates it to gateway device 104. When gateway device 104 stores the IoT data per above teachings, it encrypts the data with its public key portion of the key-pair. Once the encrypted data is communicated to the target server at corporate data center 116, it then uses its private key portion of the key-pair to decrypt the data.

It is expected that during the operation of IoT environment/site 102, various IoT devices amongst IoT devices 108A, 108B, . . . shown will fail and be replaced, as well as new IoT devices will be added. Furthermore, the IoT devices/sensors will go online and offline and be connected/disconnected to LAN 110 during the normal operation. In a similar fashion, new gateway devices 104 may also join network 110 as needed. For example, a new gateways device may be brought online on LAN 110 if an old gateway fails. Alternately, as new IoT devices are added to IoT environment/site 102 additional gateway devices 104 may be need to aggregate, store and transmit their IoT data per above teachings. Therefore, a suitable mechanism is needed for these gateways devices to discover LAN key managers 106.

This problem is solved by a local key manager discovery protocol according to the present design. The instant local key manager discovery protocol allows the gateway devices to identify LAN key managers 106 on LAN 110 so that they can connect to the LAN key managers. Because the design allows for the gateways to connect to the LAN key managers without any user intervention or any other manual configuration, this process is also referred to as "auto-enrolling" the gateways with the LAN key managers.

The local key manager discovery protocol in its simplest form may be a broadcast scheme where each gateway device is provisioned or configured to know the DNS name for one or more LAN key managers 106 on LAN 110. As a new gateway device 104 comes online it accesses the one or more LAN key managers 106 simply by its name using a domain name system (DNS) lookup, in a manner similarly to how internet websites and servers are looked up and accessed by web browsers. In such an embodiment, the names and IP addresses of the LAN key managers are stored as DNS records in a DNS name server.

For example, a DNS record entry of an A record of the form: A <IPV4 address> or an AAAA record of the form: AAAA <IPV6 address> may be used to resolve a human-readable name to an IP addresses. Utilizing DNS techniques known in the art, the human-readable name may be LAN-KM-1.com and the IP address on LAN 110 that it points to may be 227.234.56.13. Thus, using the current design a new gateway device may simply query the DNS name server (not shown in FIG. 1) operating on LAN 110 by the predetermined name, such as LAN-KM-1.com or LAN-KM-2.com or LAN-KM-3.com to obtain the IP address for the LAN key manager. At this point, it can then connect to the LAN key manager and authenticate itself using network techniques known in the art, and obtain cryptographic keys as needed per above teachings.

The new gateway device in one embodiment may be preconfigured or provisioned with a time-limited digital certificate. When the new gateway is first booted it uses the digital certificate that contains information including the names and IP addresses on LAN 110 of available LAN key managers 106. The digital certificate further allows the gateway to authenticate itself with the one or more LAN key managers 106. The digital certificate is preferably time-limited and expires after authentication, but during the process the new gateway device now knows the identifying information of the LAN key managers to which it has already authenticated itself. It subsequently uses the identifying information to connect to the LAN key managers as needed.

In alternate embodiments, the instant local key manager discovery protocol is based on or utilizes any other suitable network discovery protocol known in the art for above-explained auto-enrolling. As an example, a scheme similar to a Wi-Fi Protected Setup (WPS) protocol may be used. In such a scheme, a proximity-based authentication is used by the new gateway device. Explained further, all LAN key managers 106 broadcast their names and/or IP addresses in a manner similar to a wireless access point (WAP). The new gateway device then authenticates itself to the LAN key manager that is the closest on LAN 110 and if it is wireless, has the strongest radio signal.

As already noted, the preferred embodiment uses symmetric encryption to encrypt data at-rest on gateway devices 104 of FIG. 1. Such an encryption regime may be represented by the following equation:

$$\text{ENC}(K_i, P_i) = C_i \qquad \text{Eq. 1}$$

Here $K_i$ is the symmetric cryptographic key of the above discussion that is used by encryption operation ENC for encrypting plaintext IoT data $P_i$ to produce corresponding ciphertext $C_i$.

Since key $K_i$ is symmetric, the converse process of decryption is performed by inverting the above operation. The decryption process is typically carried at a target backend server or computer in data center 116 where plaintext IoT data $P_i$ is to be used and is conveniently represented by the following equation:

$$\text{DEC}(K_i, C_i) = P_i \qquad \text{Eq. 2}$$

Figure 2:
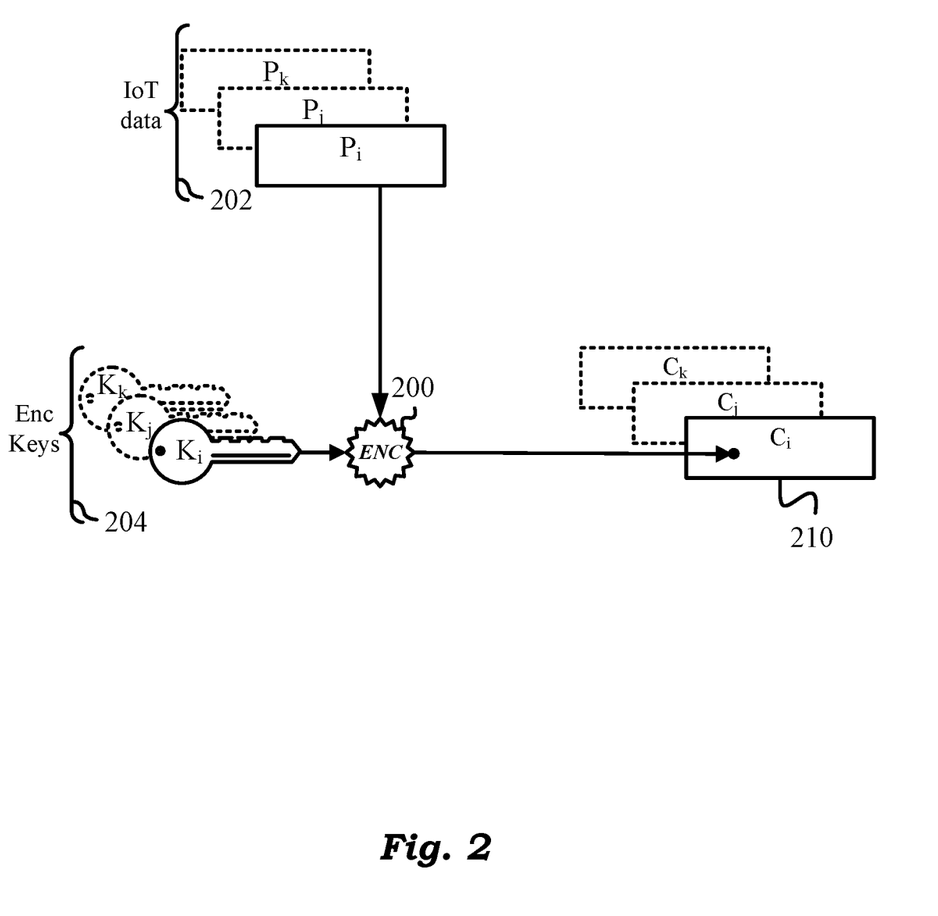
FIG. 2 illustrates the components of an encryption regime as implemented by the present design in a preferred embodiment.
Figure 3:
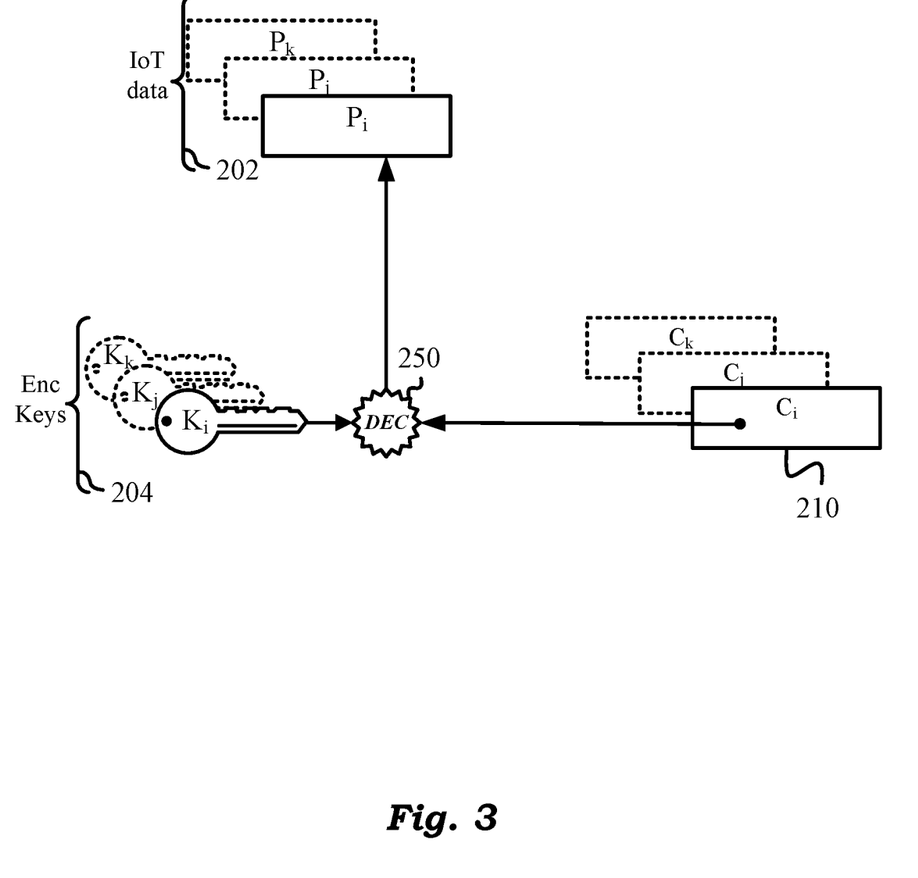
FIG. 3 is the converse of FIG. 2 and illustrates the components of a decryption regime as implemented by the present design in a preferred embodiment.

The above encryption and decryption regimes are also pictorially illustrated in FIG. 2 and FIG. 3 respectively. More specifically, FIG. 2 shows encryption operation Enc of Eq. 1 by reference numeral 200 as carried out by a given gateway device, such as gateway 104A of FIG. 1. In the scheme represented in FIG. 2, data from each of IoT devices, such as IoT devices/sensors 108 of FIG. 1, is encrypted using a unique key. In other words, the scheme represented in FIG. 2 and FIG. 3 is a "unique key per IoT device" encryption scheme. As noted above, the scope of the instant principles is by no means limited to such a scheme and FIG. 2 and FIG. 3 are representations of possible embodiments for explanatory purposes. Other encryption policies and regimes are entirely conceivable within the present scope.

Enc operation 200 of FIG. 2 takes as inputs plaintext data 202 $P_i$, $P_j$, $P_k$ from respective IoT device i, j, k (not shown in FIG. 2) and encrypts them with respective symmetric encryption keys 204 $K_i$, $K_j$, $K_k$ respectively. Enc operation 200 produces ciphertext data 210 $C_i$, $C_j$, $C_k$ to respective plaintext data 202 $P_i$, $P_j$, $P_k$ as produced by applying Eq. 1 above.

In a similar manner, FIG. 3 shows decryption operation 250 of Eq. 2 above that takes as inputs symmetric encryption keys 204 $K_i$, $K_j$, $K_k$ and ciphertext data 210 $C_i$, $C_j$, $C_k$ to produce respective plaintext data 202 $P_i$, $P_j$, $P_k$.

In alternate embodiments, the encryption used by gateway devices 104 to encrypt IoT data 114 is authenticated encryption. Authenticated encryption simultaneously provides confidentiality, integrity, and authenticity assurances on the plaintext IoT data aggregated by the gateway devices. Then the converse process of authenticated decryption only decrypts the encrypted or ciphertext data at the backend target server of corporate data center 116 if the integrity of the ciphertext data is verified, and fails otherwise.

More specifically, the authenticated encryption operation of the present design may be expressed by the equation:

$$\text{ENC}(K_i, IV_i, P_i, \text{AAD}) = C_i \text{ and } T_i \quad \text{Eq. 3}$$

Here $K_i$ is the symmetric cryptographic key of the above discussion that is used by the authenticated encryption operation ENC for encrypting plaintext IoT data $P_i$ to produce corresponding ciphertext $C_i$. $T_i$ is an authentication tag produced by the authenticated encryption that is later used to verify the integrity of the ciphertext $C_i$ produced. $IV_i$ is the initialization vector that is used for encryption. In the preferred embodiment $IV_i$ is based on gateway device 104. It may be the media access control (MAC) address of the gateway device or a convenient transformation applied to it. Alternatively, it may be some other unique identifier associated with the gateway. Still alternatively, $IV_i$ may be associated to IoT device/endpoint 108 whose data is being encrypted and as such may be the MAC address of the IoT device. In other variations, $IV_i$ may be based on a combination of the MAC addresses of the gateway and the IoT devices. In Eq. (3) above, AAD stands for additional authenticated data, and is obtained by preferably performing a secure hash algorithm 2 (Sha-2) function on additional fields, including $IV_i$. AAD may also be left blank or not used as desired. As noted, the above encryption simultaneously provides confidentiality, integrity, and authenticity assurances on the data being encrypted.

Since key $K_i$ is symmetric, the converse process of decryption is performed by inverting the order of operation and applying the authentication tag $T_i$. The authenticated decryption process is typically carried at a target backend server or computer in data center 116 where plaintext IoT data $P_i$ is to be used and is conveniently represented by the following equation:

$$\text{DEC}(K_1, IV_i, C_i, \text{AAD}, T_i) = P_i \text{ if the inputs are authentic, FAIL otherwise.} \quad \text{Eq. 4}$$

Figure 4:
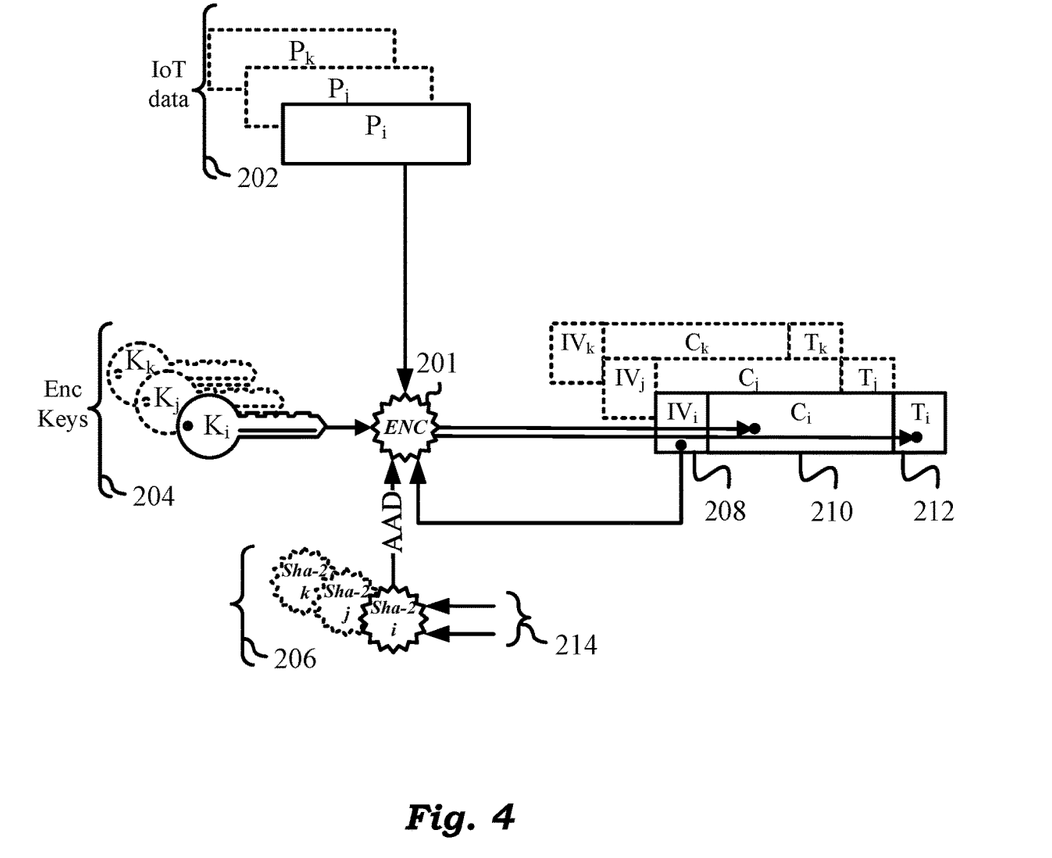
FIG. 4 is a variation of FIG. 2 where the encryption used is an authenticated encryption according to the instant principles.
Figure 5:
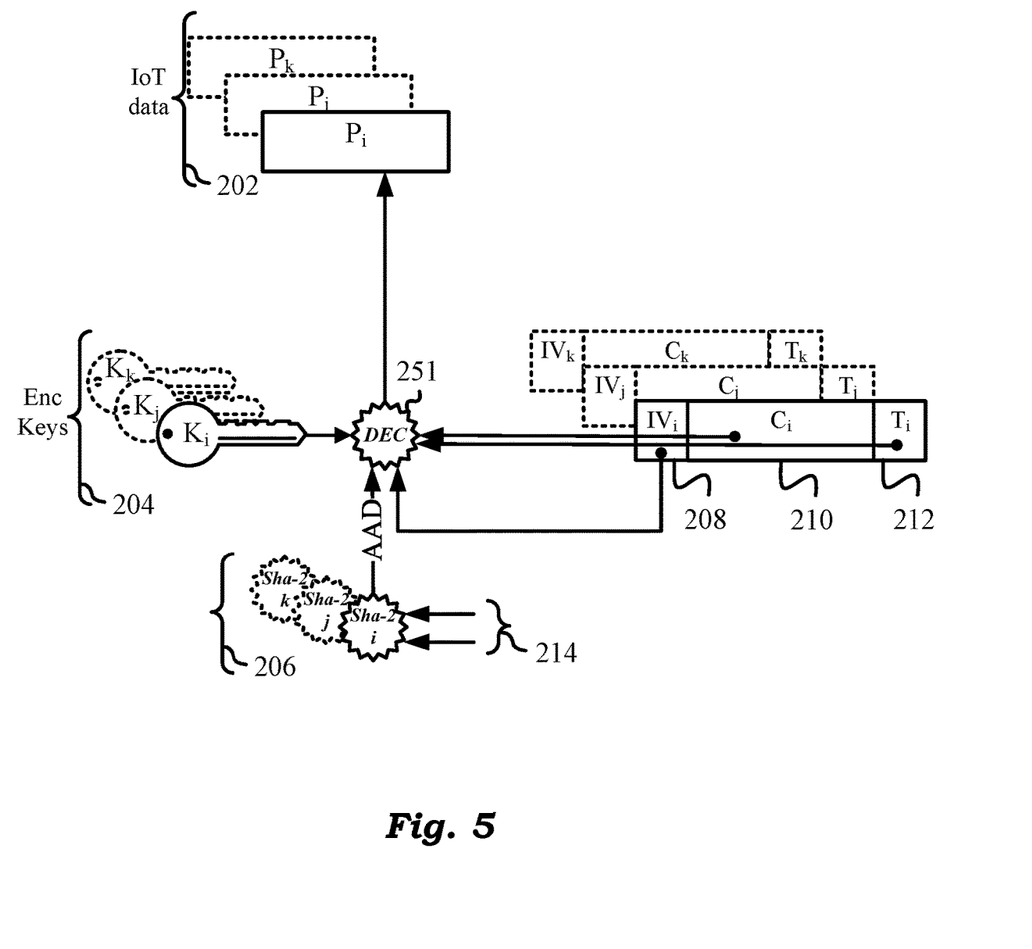
FIG. 5 is a converse of FIG. 4 and shows a variation of FIG. 3 where the decryption used is an authenticated decryption according to the instant principles.

The above authenticated encryption and decryption regimes are also pictorially illustrated in FIG. 4 and FIG. 5 which are variations of FIG. 2 and FIG. 3 respectively. More specifically, FIG. 4 shows encryption operation Enc of Eq. 3 by reference numeral 201 as carried out by a given gateway device, such as gateway 104A of FIG. 1. In the scheme represented in FIG. 4, data from each of IoT devices, such as IoT devices/sensors 108 of FIG. 1, is encrypted using a unique key. As noted above, the scope of the instant principles is by no means limited to such a scheme and FIG. 4 and FIG. 5 are representations of possible embodiments for explanatory purposes. Other encryption policies and regimes are entirely conceivable within the present scope.

Enc operation 201 of FIG. 4 takes as inputs plaintext data 202 $P_i$, $P_j$, $P_k$ from respective IoT device i, j, k (not shown in FIG. 4) and encrypts them with respective symmetric encryption keys 204 $K_i$, $K_j$, $K_k$ respectively. Per Eq. 3 above, Enc 201 further takes as inputs respective initialization vectors 208 $IV_i$, $IV_j$, $IV_k$. In an exemplary embodiment each of $IV_i$, $IV_j$, $IV_k$ are associated to or cryptographically tied to respective IoT devices j, k whose plaintext data $P_i$, $P_j$, $P_k$ is being encrypted.

FIG. 4 further shows ciphertext data 210 $C_i$, $C_j$, $C_k$ along with respective authentication tags 212 $T_i$, $T_j$, $T_k$ corresponding to respective plaintext data 202 $P_i$, $P_j$, $P_k$ as produced by applying Eq. 3 above. For completeness, also shown in FIG. 4 is additional authentication data (AAD) obtained by applying respective Sha-2 (or some other suitable hashing scheme) 206 $\text{Sha-2}_i$, $\text{Sha-2}_j$, $\text{Sha-2}_k$ to input fields 214. As noted above, AAD may or may not be used based on the requirements of a given implementation.

In a similar manner, FIG. 5 shows decryption operation 251 of Eq. 4 above that takes as inputs symmetric encryption keys 204 $K_i$, $K_j$, $K_k$, Ciphertext data 210 $C_i$, $C_j$, $C_k$, initialization vectors 208 $IV_i$, $IV_j$, $IV_k$, authentication tags $T_i$, $T_j$, $T_k$ and optionally AAD data 206 to produce respective plaintext data 202 $P_i$, $P_j$, $P_k$. As noted above, authenticated decryption Dec 251 of FIG. 5 and Eq. 4 only succeeds if the inputs are authentic and have not been tampered with, and otherwise fails.

Figure 6:
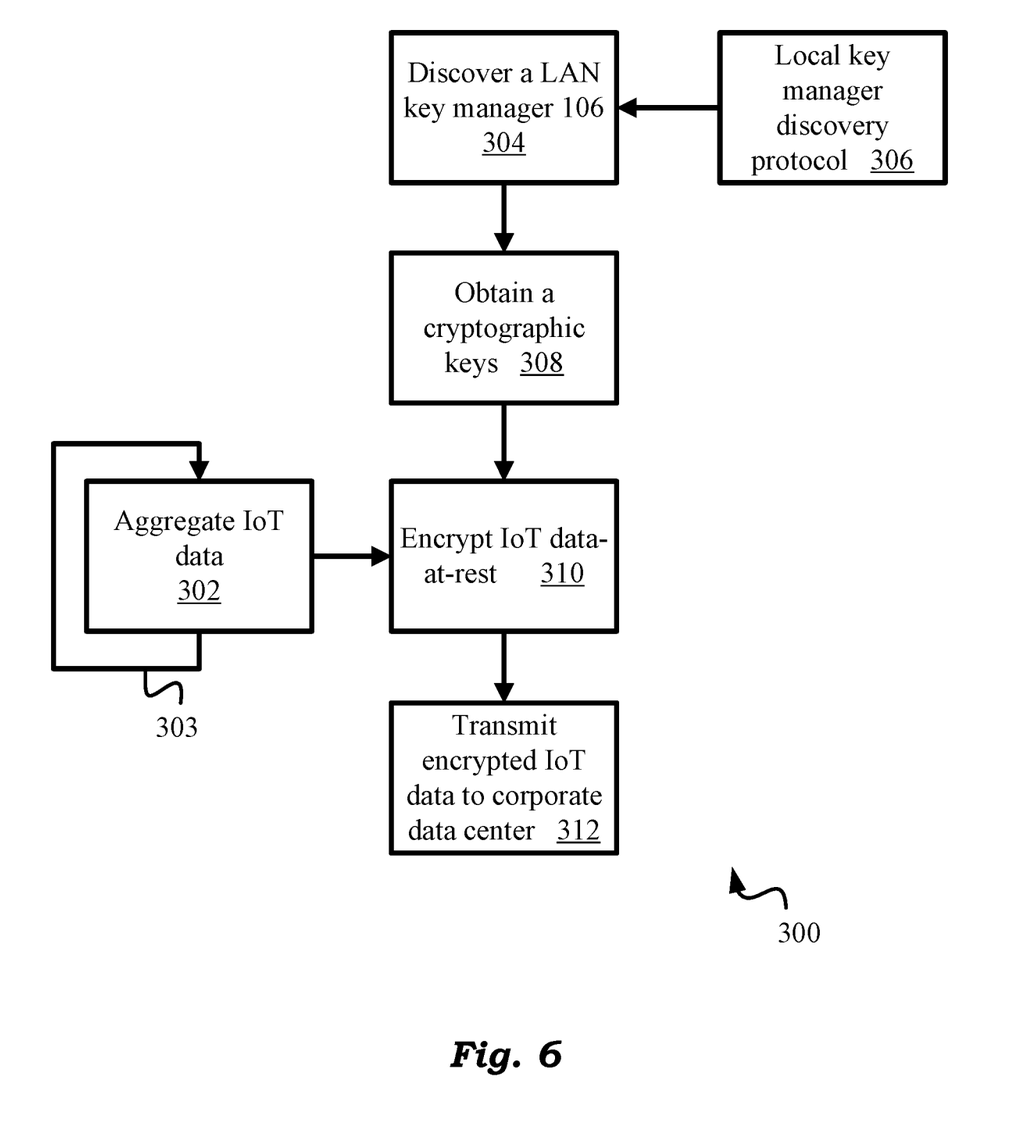
FIG. 6 shows in a flowchart form the various steps performed by an instant IoT gateway based on the instant principles.

FIG. 6 shows in a flowchart form exemplary steps required by an instant gateway device, such as gateway 104B of FIG. 1 to carry out its functions according to the instant principles. Specifically, flowchart 300 of FIG. 6 shows that the gateway aggregates incoming IoT data on a regular or continual basis as shown by block 302 and its loop 303. In specific implementations, this aggregation may be on a push or pull basis/model per above teachings. In other embodiments, the data aggregation may also be on-demand basis or any other data aggregation scheme/regime required for a given implementation.

Flowchart 300 of FIG. 6 further shows, that the gateway device discovers an available LAN key manager 106 as shown by block 304. For this purpose, it utilizes the instant local key manager discover protocol of above discussion, as shown by block 306. Once the gateway has discovered the LAN key manager, it then obtains the cryptographic keys needed by it to encrypt the aggregated IoT data-at-rest per above explanation. This is indicated by block 308. Following that, as shown by block 310 the gateway device encrypts IoT data per Eq. (1) and FIG. 2 or alternatively Eq. (3) and FIG. 4 above and associated explanation. It then transmits the encrypted IoT data as shown by block 312 to a target server of corporate data center 116 of FIG. 1 and associated explanation. Of course, such transmission/communication of encrypted IoT data is possible when connection 112 of FIG. 1 is working or established.

Figure 7:
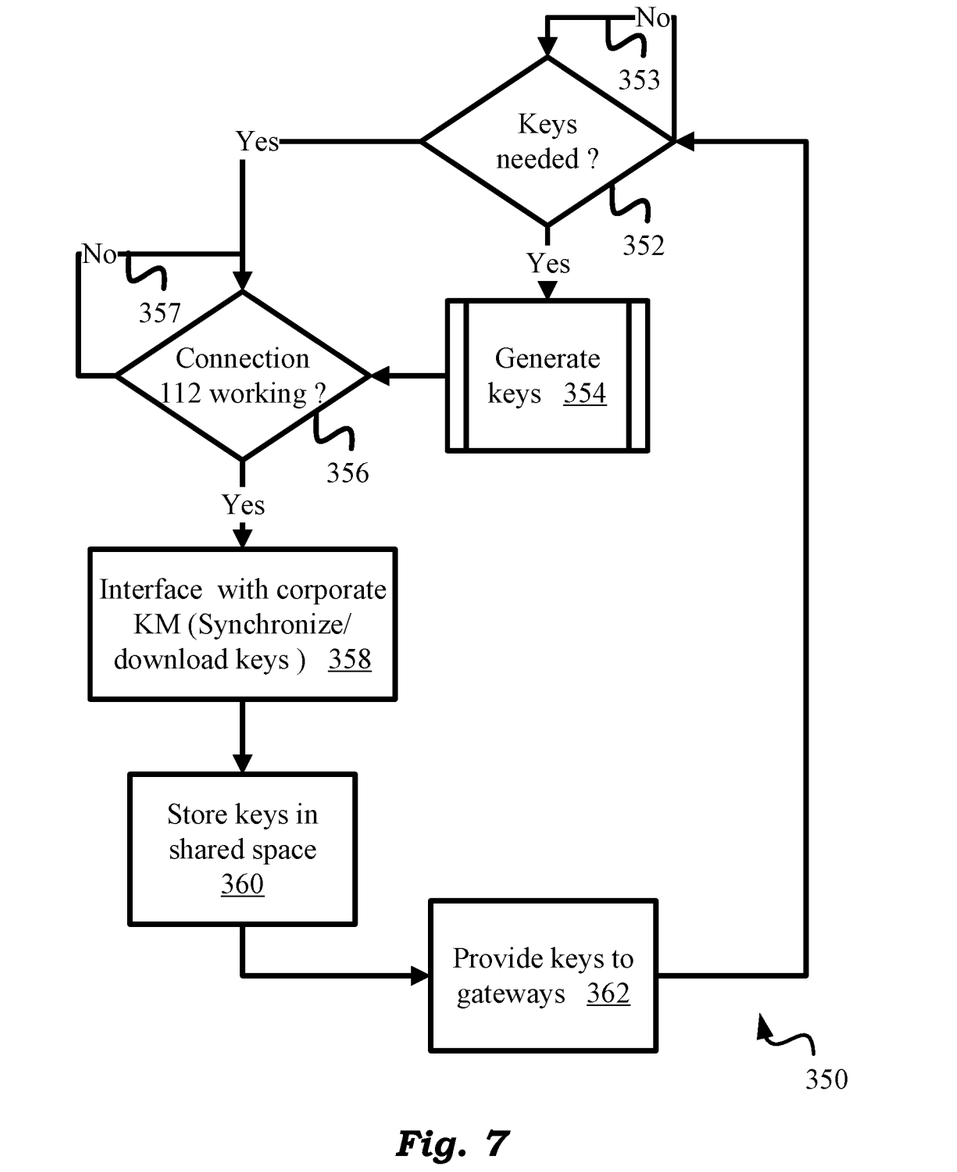
FIG. 7 shows in a flowchart form the various steps performed by an instant LAN key manager based on the instant principles.

FIG. 7 shows in a flowchart 350 the set of steps required by a LAN key manager, such as LAN key manager 106A of FIG. 1, to carry out its functions for an embodiment of the present design. Specifically, decision diamond 352 of FIG. 7 indicates whether cryptographic keys are needed by the LAN key manager. As noted, that in the preferred embodiment various LAN key managers operating in an IoT environment store the cryptographic keys in a shared space. The shared space where the keys are stored is secured or encrypted by additional wrapping/encrypted keys. Now, if the answer to decision diamond 352 is no, then the decision is revisited as shown by loop 353. This revisiting is done on a periodic, on-demand or any other configured basis. If the answer to the decision diamond is Yes, then based on the implementation, the LAN key manager may generate its own keys as shown by sub-process block 354.

Alternatively, or in addition it may download the keys from corporate key manager 118 of FIG. 1 per above explanation. If it generates the keys then it needs to interface with the corporate key manager to synchronize per above teachings. If it needs to download the key then it also needs to interface with the corporate key manager to download the next batch of keys. In any case, it thus first needs to check whether connection/connectivity 112 of FIG. 1 to corporate data center 116 and more specifically to corporate key manager 116 is working/established or not. This determination is shown by decision diamond 356 in flowchart 350 of FIG. 7. The determination of connectivity 112 above may be performed using network monitoring tools known in the art.

If the answer to decision diamond 356 is no, then this check is revisited as shown by loop 357. However, if the answer is Yes, then LAN key manager 106 interfaces with corporate key manager 116 of FIG. 1 as shown by block 358 of FIG. 7. During this interfacing it may synchronize with the corporate key manager if it has generated its own keys, and/or it may download the next batch of keys per above explanation. It then stores the keys in the shared space in IoT environment 102 as shown by block 360 and above explanation. It then provides the keys to IoT gateway devices 104 of FIG. 1 as needed, and as shown by block 362. At this point, it again checks/revisits decision diamond 352 of the above discussion to see if more keys are needed or not and performs the rest of steps per above explanation.

In the event that a gateway device 104 of FIG. 1 needs a cryptographic key and the local connectivity of LAN 110 at site 102 is disrupted such that the gateway is unable to access any of LAN key managers 106, the gateway then switches to an unsecure mode of operation. In this mode, IoT data 114 is stored on its storage media unencrypted. However, upon restoration of the local connectivity of LAN 110 and access to a LAN key manager 106, the gateway restores its normal secure mode of operation of obtaining keys from the LAN key manager and encrypting all of its IoT data 114 per prior teachings. The above detection of loss of network connectivity can be implemented by employing network monitoring and scripting tools known in the art.

It is further noted that the present design may employ any of the available standby/failover techniques, such as hot/cold standby, to instantiate a backup LAN key manager 106 in the event that a given LAN key manager fails. Such failover techniques are well understood in the art and not delved into detail int this disclosure.

In view of the above teaching, a person skilled in the art will recognize that the methods of present invention can be embodied in many different ways in addition to those described without departing from the principles of the invention. Therefore, the scope of the invention should be judged in view of the appended claims and their legal equivalents.

What is claimed is:

1. A computer-implemented method of operating at least one internet-of-things (IoT) device on a local area network (LAN), said method comprising the steps of:
 (a) operating at least one gateway device and at least one LAN key manager as members of said LAN;
 (b) collecting IoT data from said at least one IoT device onto said at least one gateway device as data-at-rest;
 (c) operating a corporate key manager in a data center with an intermittent connectivity to said LAN;
 (d) utilizing by said at least one gateway device a local key manager discovery protocol for discovering said at least one LAN key manager;
 (e) interfacing said at least one LAN key manager with said corporate key manager during a time period when said intermittent connectivity is working;
 (f) having said at least one gateway device obtain cryptographic keys from said at least one LAN key manager;
 (g) encrypting by one or more of said cryptographic keys said data-at-rest on said at least one gateway device; and
 (h) having said at least one LAN key manager download a batch of said cryptographic keys from said corporate key manager during said interfacing in said step (e).

2. The computer-implemented method of claim 1 after said encrypting, transmitting said data-at-rest from said at least one gateway device to said data center during said time period when said intermittent connectivity is working.

3. The computer-implemented method of claim 1 decrypting at a target server operating in said corporate data center, said data-at-rest encrypted in said step (g).

4. The computer-implemented method of claim 1 operating said LAN at one of an oilrig, a moving vehicle, a foreign embassy, an industrial site, a medical facility and a scientific exploration site.

5. The computer-implemented method of claim 1 generating said cryptographic keys in said at least one LAN key manager, and later synchronizing with said corporate key manager during said interfacing in said step (e).

6. The computer-implemented method of claim 1 where said encryption in said step (g) is an authenticated encryption.

7. The computer-implemented method of claim 1 having a time period when said intermittent connectivity is not working because of one of a malicious hack and a human error.

8. The computer-implemented method of claim 1 operating said at least one gateway device in an unsecure mode when it is unable to access any of said at least one LAN key manager.

9. The computer-implemented method of claim 1 utilizing the key management interoperability protocol (KMIP) in said interfacing in said step (e).

10. A secure internet-of-things (IoT) site with an intermittent connectivity to a corporate data center, said IoT site comprising:

(a) one or more IoT devices, one or more gateway devices and one or more LAN key managers on a local area network (LAN) deployed at said secure IoT site, said one or more IoT devices, said one or more gateway devices and said one or more LAN key managers comprising at least one memory device storing computer-readable instructions and at least one microprocessor coupled to said at least one memory device for executing said computer-readable instructions;

(b) IoT data generated by said one or more IoT devices, said IoT data collected and stored as data-at-rest on said one or more gateway devices;

(c) a local key manager discovery protocol to enable said one or more gateway devices discover said one or more LAN key managers;

(d) one or more cryptographic keys obtained by said one or more gateway devices from said one or more LAN key managers, said one or more cryptographic keys downloaded from a corporate key manager in said corporate data center during a time period when said intermittent connectivity is working; and wherein an encryption utilizing said one or more cryptographic keys is used by said one or more gateway devices to secure said data-at-rest, and wherein said one or more cryptographic keys are downloaded by said one or more LAN key managers from said corporate key manager in one or more batches during said time period when said intermittent connectivity is working.

11. The IoT site of claim 10 wherein said data-at-rest is transmitted by said one or more gateway devices to a target server in said corporate data center.

12. The IoT site of claim 10 at one of an oilrig, a moving vehicle, a foreign embassy, an industrial site, a medical facility and a scientific exploration site.

13. The IoT site of claim 10 wherein said encryption is authenticated encryption.

14. The IoT site of claim 10 wherein said local key manager discovery protocol is based on a broadcast scheme.

15. A system of one or more internet-of-things (IoT) endpoints operated at a secure IoT site with an intermittent connectivity to a corporate data center, said system comprising:

(a) one or more gateway devices, one or more LAN key managers and said IoT endpoints, as members of a local area network (LAN) deployed at said secure IoT site, said one or more gateway devices, said one or more LAN key managers and said one or more IoT endpoints, comprising at least one memory device storing computer-readable instructions and at least one microprocessor coupled to said at least one memory device for executing said computer-readable instructions;

(b) IoT data generated by said one or more IoT endpoints, said IoT data collected and stored as data-at-rest on said one or more gateway devices;

(c) a local key manager discovery protocol to enable said one or more gateway devices discover said one or more LAN key managers; and (d) one or more cryptographic keys obtained by said one or more gateway devices from said one or more LAN key managers, said one or more cryptographic keys generated by said one or more LAN key managers and then stored on a shared storage on said LAN;

wherein an encryption based on said one or more cryptographic keys is used by said one or more gateway devices to secure said data-at-rest, and wherein said one or more cryptographic keys are downloaded by said one or more LAN key managers from said corporate key manager in one or more batches during said time period when said intermittent connectivity is working.

16. The system of claim 15 wherein said one or more cryptographic keys are synchronized with a corporate key manager at said corporate data center during a time period when said intermittent connectivity is working.

17. The system of claim 15 wherein said encryption is asymmetric encryption.

18. The system of claim 15 wherein said local key manager discovery protocol utilizes digital certificates provisioned for said one or more gateway devices to identify said one or more LAN key managers and to authenticate said one or more gateway devices with said one or more LAN key managers.

* * * * *